Sept. 6, 1927.  R. H. MORRIS  1,641,774
DIRECTION INDICATOR
Filed April 29, 1926   2 Sheets-Sheet 2
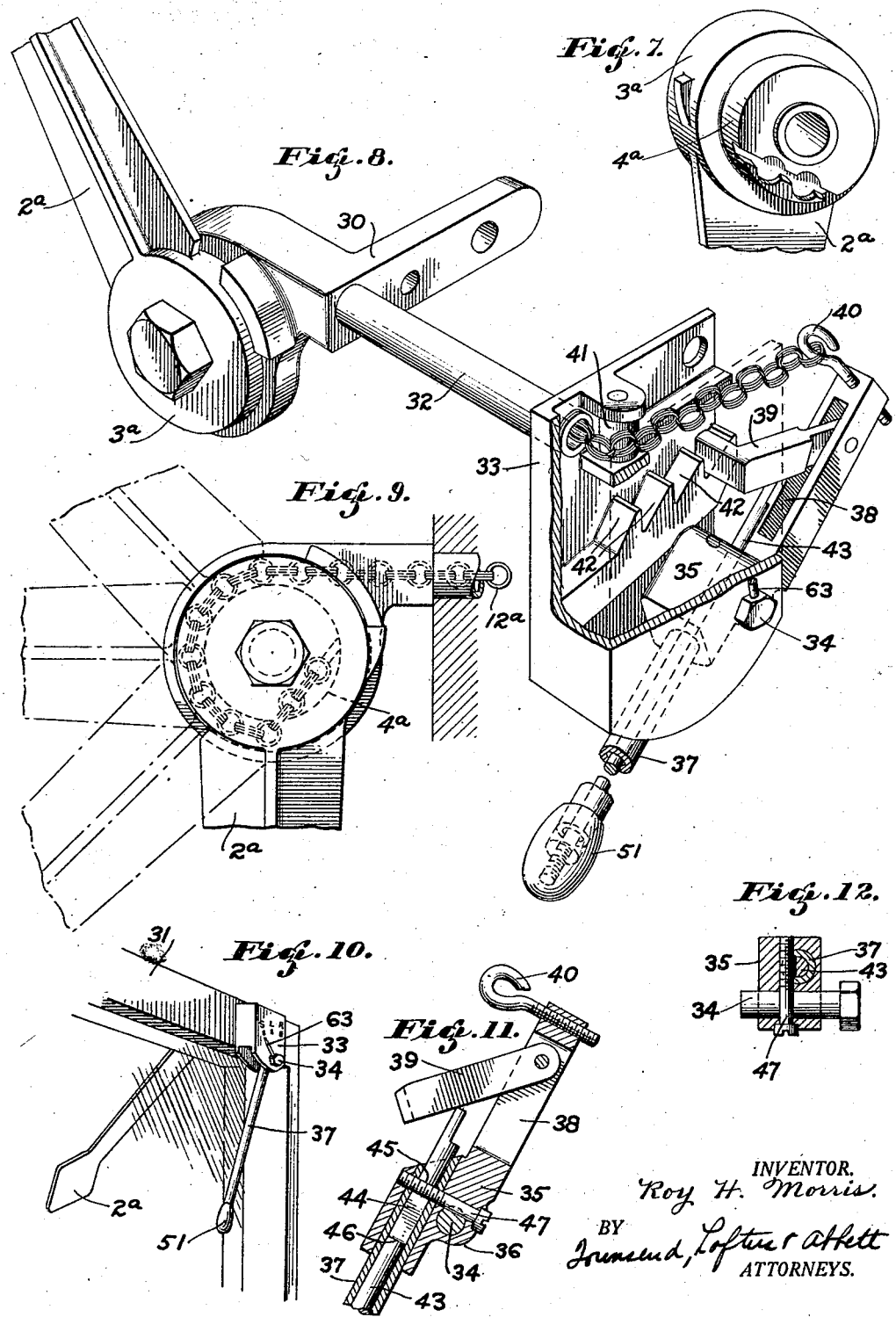
INVENTOR.
Roy H. Morris.
BY
Townsend, Loftus & Abbett
ATTORNEYS.

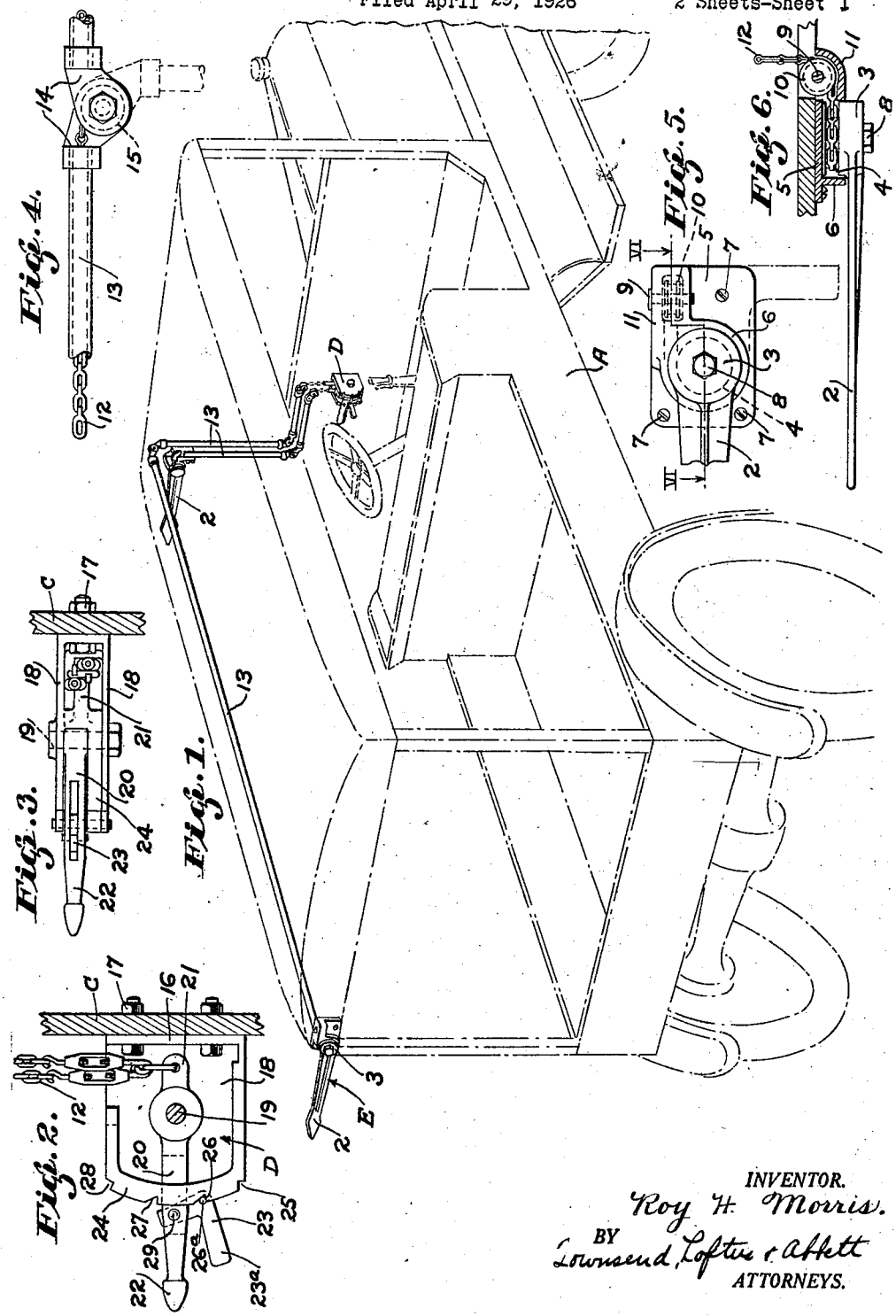

Patented Sept. 6, 1927.

1,641,774

UNITED STATES PATENT OFFICE.

ROY H. MORRIS, OF OAKLAND, CALIFORNIA.

DIRECTION INDICATOR.

Application filed April 29, 1926. Serial No. 105,364.

This invention relates to a direction indicator for use on automobiles and like vehicles. The object of the present invention is to generally improve and simplify the construction and operation of devices of the character described, and particularly to provide an actuating mechanism adapted to be placed within a car in convenient reach of the driver whereby a direction indicator in the form of an arm or arrow, mounted on the exterior of the car where it can be easily seen both by pedestrians and drivers of other vehicles, may be readily operated by the driver, and further, to provide a device of this make which is adapted for closed cars, delivery trucks and the like and which may be readily installed therein.

Several forms which the invention may assume are disclosed in the accompanying description and drawings, in which—

Fig. 1 is a perspective view showing an automobile in dotted lines and showing the direction indicator and actuating mechanism applied thereto.

Fig. 2 is a side elevation of the actuating mechanism.

Fig. 3 is a plan view of Fig. 2.

Fig. 4 is a detail side elevation of the chain conduit.

Fig. 5 is a side elevation of the direction indicator casing which supports the direction indicator arm or arrow.

Fig. 6 is a horizontal section taken on line VI—VI Fig. 5.

Fig. 7 is a perspective view of the inner end of the direction indicating arm.

Fig. 8 is a perspective view of the direction indicating arm, its supporting bracket, and also showing a modified form of actuating mechanism.

Fig. 9 is a side elevation of the inner end of the direction indicating arm and its supporting bracket, such view showing the manner of attaching the chain.

Figure 10 is a perspective view of an automobile door showing the application of the actuating mechanism illustrated in Fig. 8.

Figure 11 is a sectional view of the actuating lever and pawl shown in Figure 8.

Figure 12 is a cross section taken on line XII—XII, Fig. 11.

Referring to the drawings in detail and particularly to Figures 1, 2, 5 and 6, A indicates in general an automobile of the closed type, B the top and C the instrument board interior of the car.

The direction indicator forming the subject matter of the present application consists of two connected units, to-wit, a manually operated actuating mechanism generally indicated at D, and the indicator proper indicated at E. The actuating mechanism is mounted interior of the car, preferably on the instrument board within convenient reach of the driver, while the indicating mechanism is mounted exterior of the car, and is, in most instances, attached to the side of the top at the front end thereof, and sometimes also at the rear end thereof as shown in Fig. 1. The indicator consists of a pivotally mounted arrow 2 which is operated in accordance with the standard arm signalling system now in common use. That is, it assumes a horizontal position when the driver desires to turn to the left, a forty-five degree angular position above horizontal when turning to the right and a forty-five degree angular position below horizontal when it is desired to slow down or stop and a vertical downward position when not in operation.

The indicator arm or arrow 2 terminates in a hub member 3, see Figs. 5 and 6, on the inner face of which is mounted a drum 4. A casing is provided for the support thereof, it consists of a flat plate 5 as shown in Figs. 5 and 6 having an annular exterior flange formed thereon as shown at 6 to receive the hub and drum portion of the indicating arrow. The plate 5 is provided with holes for the reception of screws 7 and the casing may thus be bolted to the top proper or to any convenient part of the automobile. The indicating arrow is secured to the casing by a bolt 8 which extends through the hub and the drum and is secured in the plate 5. The bolt also serves as a pivot for the arm and the drum and the arm will assume different positions when in operation as will hereinafter be described. Journalled at one end of the plate on a pin 9 is a roller 10. This roller is concealed as it is partially enclosed by an extension 11 of the plate 5. A chain 12 passes over the roller 10 and is partially wrapped around the drum and is secured thereto. The opposite end of the chain passes through the body of the closed car and is carried through a conduit such as shown at 13 to the operating mechanism D which will be more fully described.

A special form of chain or cable conduit is employed, it consists of pipe sections 13 which terminate in adjustable brackets 14 between which is mounted guide pulleys 15. Right angular turns may in this manner be made without imposing any serious friction on the cable or chain and it is thus fairly simple to guide the cord or chain to any convenient point. The conduit forms the subject matter of a separate application which is to be filed and a further detailed description thereof is accordingly thought unnecessary.

The operating mechanism is best illustrated in Figs. 1, 2 and 3. It consists of a base plate 16 which is adapted to be bolted or otherwise secured as indicated at 17 to the instrument board C of the automobile. Mounted on the base plate or formed integral therewith are two interspaced side plates 18. Pivotally mounted on the bolt 19 between the side plates is an operating lever 20. One end of the lever is provided with a crank arm 21 to which the chain 12 is attached as shown in Fig. 2 while the other end of the lever is provided with a handle 22 and a pawl 23 which rides over a ratchet bar 24 disposed between the plates 18. The ratchet bar is provided with four teeth such as indicated at 25, 26, 27 and 28. The pawl 23 is provided with a pin 26ª which is adapted to engage the notches or teeth just referred to and the pawl is furthermore provided with a handle extension 23ª which acts as a weight to normally hold the pawl pin in engagement with the teeth, the pawl being, of course, pivotally attached to the lever as shown at 29. In actual operation when the automobile is in motion and it is desired to turn a corner, for instance, to the left, the driver merely reaches forward and grasps the handle 22 of the operating lever. By lifting it in an upward direction until the pawl pin engages with the tooth 27 a pull is transmitted to the chain 12 through the crank arm 21 and as the opposite end of the chain is wrapped about the drum 4 and attached thereto it will rotate the drum and the hub member 3 until the arrow 2 assumes a horizontal position such as shown in Fig. 1. The horizontal position of the arrow indicates to pedestrians or drivers of other vehicles that a lefthand turn is to be made. The driver releases the operating handle 22 at this point as it is automatically locked in this position by engagement of the pin 26ª with the tooth 27. When the lever is lifted until the pawl 26 engages the tooth 28 arrow 2 will assume the forty-five degree angular position above horizontal. If engagement of the pawl pin is made with the tooth 26 arrow 2 will assume a forty-five degree angular position below horizontal and if engagement is made with the notch 25 the arrow will assume a vertical downward position which is its normal inoperative position. The different standard hand signals are thus given and without any inconvenience to the driver and the indicating arrow will assume its signalling position until it is released by the driver. The usual inconvenience of opening up the window and projecting the hand and arm to give a signal is thus avoided which will surely be appreciated by the average driver, particularly when driving in wet and cold weather when it is desired to keep the window closed.

In Fig. 2 it will be noted that two chains are attached to the crank arm 21. This is only necessary where an indicating arrow is placed on the front and the rear of a closed car as shown in Fig. 1. If a single indicating arrow is employed only one chain and conduit 13 will be required.

In Figs. 7, 8, 9 and 10 another form of the mechanism is disclosed. It is particularly designed for attachment to the door frame of a closed car. A bracket 30 is provided on the exterior of the door indicated at 31, see Figs. 8 and 10. The indicating arrow 2ª is in this instance also provided with a hub 3ª and a drum 4ª. A chain 12ª is attached at one end to the drum and the opposite end passes through a pipe 32 which extends through the frame of the door. The opposite end of the pipe is connected with a housing 33 which is bolted to the inner face of the door frame. Pivotally mounted on a bolt 34 extending through the housing is a lever 35. This lever is offset as indicated at 36, see Figs. 8 and 11, and the lower end is drilled out to receive a tubular downwardly extending lever 37. The upper end of the lever is slotted as at 38 and carries a pivoted pawl 39 and a hook 40 to which the chain 12 is attached. A guide pulley 41 is mounted on the inner surface of the casing and this forms a guide to direct the chain into the tube 32. The pawl 39 mounted on the operating lever 35 engages stationary teeth 42 in the lower part of the casing as shown in Fig. 8, thus making it possible to lock the operating lever and the directing arrow in any position desired, the operating lever and arrow being released by raising the pawl through a trip rod 43. This rod is round and has one side cut away as indicated at 44, see Fig. 11. Two shoulders are thereby formed as shown at 45 and 46 which serve as stop members to limit movement of the trip rod. A screw 47 passes through the lever 35 at a point where it engages the shoulders 45 and 46. The screw also passes through a part of pin 34 and the tube 37 thereby locking these members against removal, see Figs. 11 and 12. The pawl locks the lever in any one of the positions desired and it is thus possible to retain the indicating arrow in any position to which it may be set until it is released by the driver. This is accomplished by extending the rod 43 through the operating handle 37. The lower end of the rod is provided with a push button or handle 51 and the upper end is adapted to engage the latch and raise the same away from the teeth 42 when it is desired to return the mechanism to normal position or any other position. The pivot pin 34 carrying the actuating lever 35 has one end extended through the casing and a small indicating arrow for the convenience of the operator is secured on the extended end of the pin. This arrow is shown at 63 in Fig. 10. When the indicating mechanism assumes inoperative position the arrow 63 indicates that position. When stop position is reached letter "S" indicates stop position and similar marks are provided for left and right turns by providing the letters "L" and "R". In other words, the driver sitting inside of the car will always know the exact position assumed by the indicating arrow on the exterior.

The direction indicator whether constructed along the lines shown in Figs. 1, 2 and 5 or along the lines shown in Figs. 7 and 8 etc., may in each instance be quickly and readily installed in practically any automobile whether it be of the closed type or otherwise. It may be mounted directly on the door as shown in Fig. 10, or it may be mounted partly on the instrument board and partly on the automobile top as shown in Fig. 1. A proper visible signal can be given under all weather conditions and greater safety in driving will thus be insured.

While certain features of the present invention have been more or less specifically illustrated and described, I wish it understood that certain changes may be resorted to within the scope of the appended claims. I also wish it understood that the materials and finish employed may be such as the manufacturer's experience and judgment may dictate or various conditions may demand.

Having thus described my invention what I claim and desire to secure by Letters Patent is—

1. A device of the character described comprising a casing, said casing having a cylindrical shaped chamber formed therein and a duct disposed on a tangent thereto and communicating therewith, an arm pivotally mounted on the casing concentric with the cylindrical shaped chamber and forming a cover therefor, a drum on the arm and extending into the cylindrical shaped chamber, a flexible member wrapper around the drum, one end of said flexible member being secured to the drum and the other or free end of the flexible member extending through the tangentially disposed duct and a manually operated mechanism whereby a pull is transmitted to the free end of the flexible member to swing the drum and arm to assume different positions.

2. A device of the character described comprising a casing, said casing having a cylindrical shaped chamber formed therein and a duct disposed on a tangent thereto and communicating therewith, an arm pivotally mounted on the casing concentric with the cylindrical shaped chamber and forming a cover therefor, a drum on the arm and extending into the cylindrical shaped chamber, a flexible member wrapped around the drum, one end of said flexible member being secured to the drum and the other or free end of the flexible member extending through the tangentially disposed duct, a manually operated lever to which the free end of the flexible member is connected and whereby movement is transmitted to swing the drum and arm to assume different positions and a stop lock on the casing limiting the swinging movement of the arm.

ROY H. MORRIS.